Dec. 15, 1942.  E. F. RICHTER  2,305,195
PRINTING DEVICE
Filed Jan. 23, 1941  2 Sheets-Sheet 1
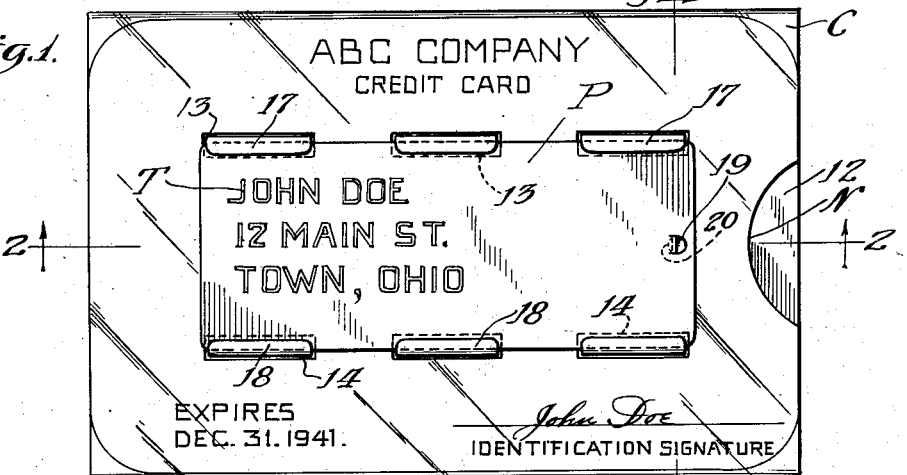
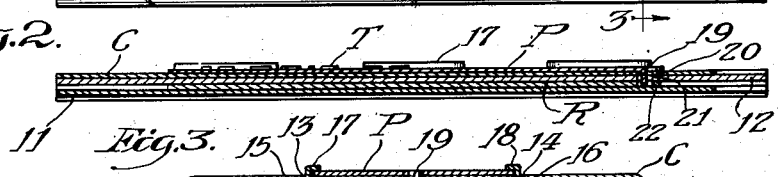
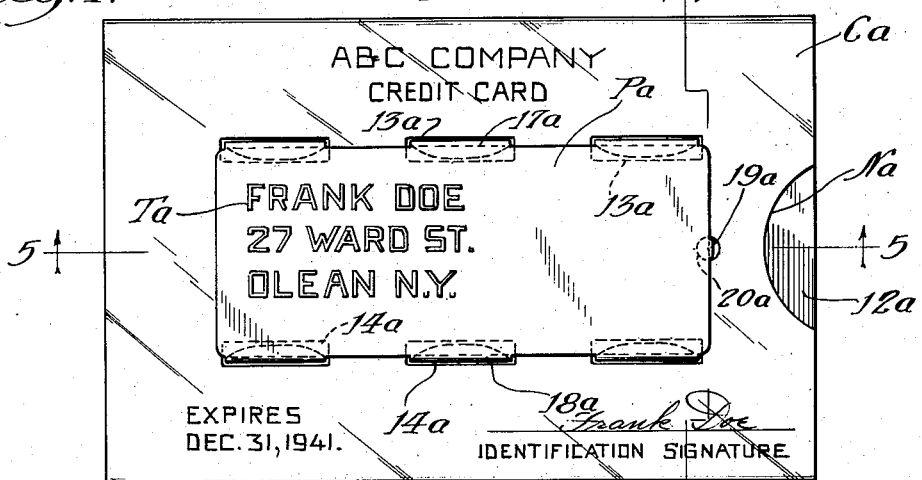
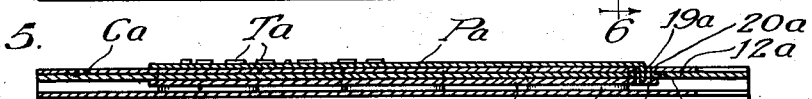
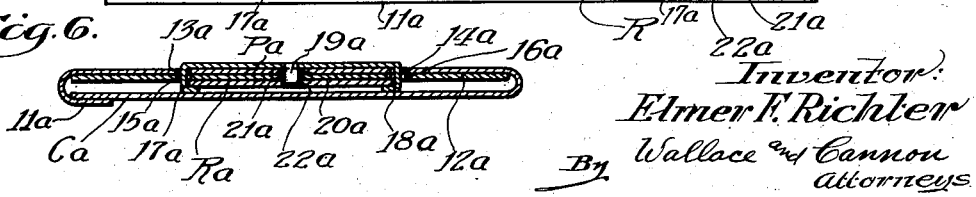
Inventor:
Elmer F. Richter
By Wallace and Cannon
Attorneys Dec. 15, 1942.  E. F. RICHTER  2,305,195
PRINTING DEVICE
Filed Jan. 23, 1941  2 Sheets-Sheet 2
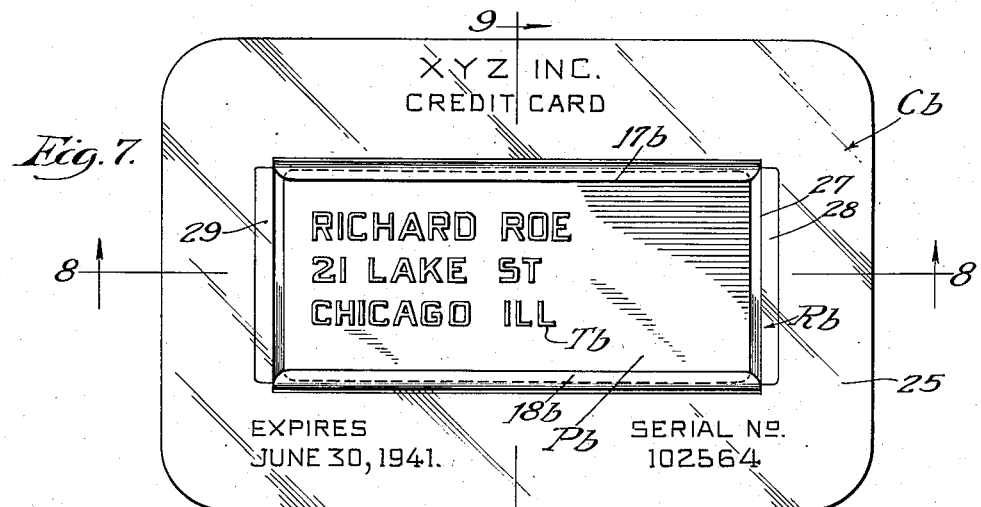
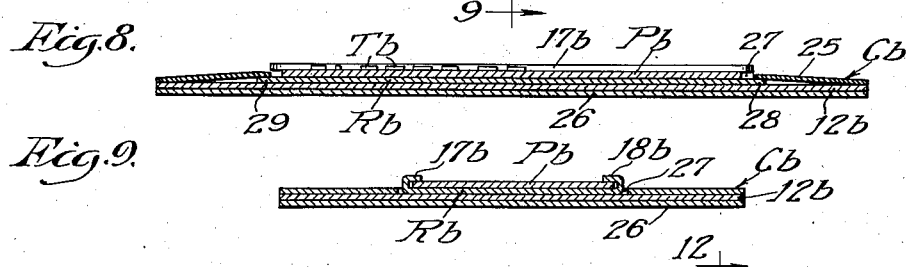
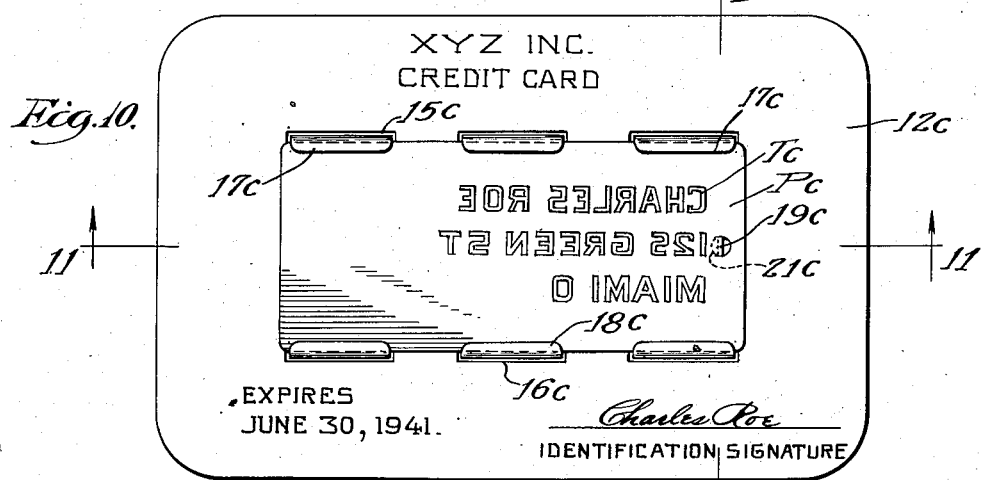

Patented Dec. 15, 1942

2,305,195

UNITED STATES PATENT OFFICE 2,305,195

PRINTING DEVICE

Elmer F. Richter, Cleveland Heights, Ohio, assignor to Addressograph-Multigraph Corporation, Cleveland, Ohio, a corporation of Delaware Application January 23, 1941, Serial No. 375,555

18 Claims. (Cl. 101—369)

This invention relates to printing devices of the kind from which data, such as a name and address, may be printed to insure accuracy in preparing business instruments and the like in connection with business transactions entailing, for example, the extension of credit pursuant to data borne by the printing devices.

Many business institutions, of which commercial air lines and the retailers of gasoline, oil and like supplies for automotive vehicles to the motoring public are an example, have a large number of outlets or places of business, frequently scattered over a wide territory, from any one of which credit may be extended to customers. In order that this may be done, the customers are usually furnished with an identification, commonly referred to as a credit card, bearing, among other things, the name and address of the customer entitled to the use of the same, the regulations under which credit is extended, a statement as to the duration of validity of the card, a space for the signature or other identification of the customer and kindred data. Heretofore when such cards have been presented, the name and address and other identification data appearing on the card, such as an account or serial number, have been copied from the card onto the business instrument made out in connection with the particular transaction. Inasmuch as this copying has been done manually errors have occurred, resulting in loss to the institution or improper invoicing of customers of the institution, which impairs good will, and such errors were otherwise objectionable.

Furthermore, some institutions, as for example retail department stores, have issued printing devices from which the name and address of a person to whom credit is extended could be printed onto a business instrument pertaining to a transaction in which credit is extended. Such institutions, usually having but one or two places of doing business, are enabled to keep close check on the customers to whom credit is extended. Moreover, the items in connection with which credit is extended under such circumstances are customarily not immediately delivered to the customer but are usually delivered at a later time. Thus while such printing devices have, to a large extent, eliminated errors, such as might arise from improper addressing and the like, the printing devices have been more or less permanent in character and when a need for change has arisen, one relatively expensive device has customarily been destroyed and another has been substituted in place thereof. Furthermore, when the extension of credit to a customer was to be stopped, this could usually be done without requiring surrender of the device.

However, where, as explained hereinabove, a business institution has a large number of outlets, frequently distributed over a large area, it is not possible to keep such a close check on the customers to whom credit is extended and moreover the merchandise or service in connection with which credit is extended is usually delivered or rendered simultaneously with the extension of credit. Hence, the credit cards which have been issued for use in such transactions have been issued heretofore to be valid for but relatively short periods as, for example, for but a single calendar quarter, so that in the event a customer is delinquent in payments or for other reason credit should not be extended, it has been possible to withhold the issuance of further credit cards, and hence credit, to such a customer. However, as explained hereinabove, the credit cards were of such a nature that it was necessary that information be copied therefrom in each transaction in which credit was extended and, as also explained above, because of this errors have arisen. Moreover, devices of the character to which this invention pertains may not only be advantageously used by business institutions and the like having a large number of places of business, and of which commercial air lines and retailers of automotive supplies are examples, but the devices may also be advantageously employed by retail department stores and the like for the devices of this invention enable a close check to be kept on the users thereof. Furthermore, devices of this character may be used in many other ways than in connection with the extension of credit as, for example, employee identification cards or in other personnel and like work.

Thus the primary object of my invention is to eliminate the necessity of manually copying data in connection with each transaction in which credit is extended and yet at the same time enable expeditious and frequent renewal of the authorization for obtaining credit in an inexpensive manner, comparable in cost and facility to the relatively inexpensive issuing of credit cards as has been done heretofore.

Another important object of my invention is to detachably associate printing means, such as a metal plate having type characters embossed thereon, with a carrier having identification data associated therewith so that the identification data may be renewed from time to time, as desired, without the necessity of renewing or replacing the printing means.

Inasmuch as devices of the character to which this invention pertains are usually carried on the person of the user thereof, it is desirable that mutilation, because of careless or frequent handling and the like, be avoided and yet at the same time it is desirable that the information pertinent to the extension of credit be readily ascertainable. Likewise, it is desirable that type characters or other printing means be afforded so as to thereby eliminate the necessity of manually copying information pertinent to the extension of credit, for the provision of type characters and the like enables such information, as has heretofore been manually copied, to be printed whereby the errors attendant to the copying of such information may be avoided.

In view of the foregoing, yet another important object of this invention is to utilize a transparent carrier in which a transitory member, such as a credit card or the like, may be mounted in such a way as to be protected against mutilation and yet so that the information that need be derived therefrom may easily be ascertained and to also incorporate in such carrier a permanent member embodying type characters or the like from which information pertinent to a particular business transaction may be printed at the time of the transaction.

A more specific object of the present invention is to provide a relatively inexpensive device embodying a transparent carrier or envelope in which a transitory member, such as a credit card or the like may be mounted to be protected thereby and to also incorporate in such a carrier a metallic plate or the like bearing type characters from which information pertinent to the extension of credit or other business transaction may be readily printed; to detachably retain a printing plate or the like of the aforesaid character on the carrier therefor to enable expeditious replacement of the plate or the like when the need so to do arises as might be occasioned when the customer, to whom a device of the character to which this invention has been issued, has moved from one address to another; to enable frequent and inexpensive replacement of the carrier when the need so to do arises; to enable expeditious and economical replacement of a transitory member, such as a credit card when such is supplied as a part separate from the carrier; and to provide a simple and economical device of the aforesaid character which will be efficient and positive in use.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is an elevational view of a device embodying my invention;

Figs. 2 and 3 are sectional views taken substantially on the lines 2—2 and 3—3 on Fig. 1, looking in the direction of the arrows on said lines;

Fig. 4 is a view similar to Fig. 1 but showing another form of my invention;

Figs. 5 and 6 are sectional views taken substantially on the lines 5—5 and 6—6 on Fig. 4, looking in the direction of the arrows on said lines;

Fig. 7 is another view similar to Fig. 1 but showing still another form of my invention;

Figs. 8 and 9 are sectional views taken substantially on the lines 8—8 and 9—9 on Fig. 7, looking in the direction of the arrows on said lines;

Fig. 10 is yet another view similar to Fig. 1 but showing a further form of my invention; and Figs. 11 and 12 are sectional views taken substantially on the lines 11—11 and 12—12 on Fig. 10, looking in the direction of the arrows on said lines.

The form of my invention shown in Figs. 1, 2 and 3 includes a transparent envelope or carrier C afforded by folding a substantially rectangular transparent sheet of plastic material or the like upon itself into substantially U-shaped formation. Preferably the sheet is folded in such a way that one limb is of greater length than the other whereby the resultingly extended marginal portion as 11 thereof, Fig. 3, may be folded over onto the outer face of the shorter of the limbs and adhesively or otherwise secured thereto. This arrangement is such as to afford an envelope or sleeve into which a card 12 of cardboard or like material may be slid to be neatly embraced between the closed ends of the sleeve or carrier C and to be substantially coextensive with the sleeve between the open ends thereof.

Among the plastic or like materials from which the transparent sheet that is formed into the carrier or sleeve C may be produced is cellulose acetate, but other synthetic materials, for example, one of the vinyls, as polyvinyl acetate-chloride, and also methyl metha-crylate and ethylene benzene may be used as desired. In any event the sheet should possess sufficient rigidity to be self-sustaining and it should be of such a nature that it will not readily tear or be subject to other mutilation since one of the functions of the transparent carrier is to protect the card 12, which is enclosed therein, and, as will be described presently, the carrier also serves as a support for a printing plate or the like.

Where the device of the present invention is to be used in the extension of credit, the face of the card 12 which appears in Fig. 1 will bear data such as the name of the issuing company or the like, a date beyond which credit is not to be extended, a place whereat the person to whom credit is extended may sign for the purpose of identification and other kindred data such as the terms and conditions under which credit is extended. The card 12 is preferably inserted into the sleeve or carrier C with the face of the card bearing the just mentioned data disposed toward the face of the carrier that appears in Fig. 1, which is a discontinuous face in contradistinction to the opposite preferably continuous face.

The face of the sleeve or carrier C appearing in Fig. 1 is rendered discontinuous by forming therein, in the present instance, two series of openings 13 and 14, the openings 13, in what will be referred to as the upper series, being aligned one with the other as are the openings 14, in what will be referred to as the lower series thereof. The two series of openings are spaced one from the other in a predetermined amount and the openings in each series are preferably spaced equidistantly one from the other and they are also suitably spaced from the open ends of the carrier C. The card 12 has a series of openings 15 and another series of openings 16 formed therein, the series of openings 15 and 16 being spaced from each other in such a way that, when the card 12 is properly inserted into the carrier C, the openings 15 will be respectively aligned with openings 13 and the openings 16 will be respectively aligned with openings 14.

As explained hereinabove, it is desirable that a device of the character to which this invention pertains embody means from which a printed impression may be made for so to do will insure against error in making out invoices and the like involved in business transactions in which, for example, credit is extended pursuant to data on the card 12. To this end, in the present instance, a metallic printing plate P is provided which has type characters T embossed thereon to appear in relief on one face thereof and in intaglio on the opposite face.

In the form of my invention shown in Figs. 1, 2 and 3 the type characters T are so embossed in the plate P that the portions thereof which appear in relief may be read in an ordinary manner for so to do facilitates ascertaining what may be printed from such type characters. As will be explained, it is not essential that the type characters be embossed in this manner but when the type characters are so embossed, the device will be inserted into a suitable printing machine in such a way that the plate will be disposed on one side of a sheet on which an improvession is to be made and suitable inking means, such as an ink ribbon, will be disposed on the opposite face of the sheet so that when pressure is applied to thereby squeeze the sheet between the ink ribbon or the like and the type characters as T, an impression will be made on the sheet. If a plurality of sheets are to be printed in each impression operation, suitable carbon paper will be arranged between the plurality of sheets, in the manner well understood in the art, with the coated surface of the carbon paper disposed toward the type characters T so that an impression which may be read in an ordinary manner will be made as a result of the application of pressure.

It is desirable that the card 12 be retained against endwise movement in the sleeve or carrier C and it is also desirable that the plate P be retained in position medially on the outer face of the carrier so that an impression may be readily made from the type characters T thereon. Furtherfore, data, such as that explained hereinabove, that is carried by the card 12 is located thereon to be displayed through the transparent carrier and about the plate P when it is retained on the carrier C. Moreover, in order that satisfactory impressions may be made from the type characters T on the plate P, it is advantageous to include a reinforcement for the plate in the device.

Hence, a metallic holder or reinforcement R, complementary in outline to the plate P, is provided and this reinforcement has a series of lips 17 and 18, along opposite edges thereof. The lips 17 and 18 in the two series thereof are spaced one from the other to respectively align with the series of openings 13 and 14 when the reinforcement R is properly inserted into the carrier C.

Prior to the time the card 12 is inserted into the carrier C, the lips 17 and 18 are respectively passed through the openings 15 and 16 in the card 12, and this card is then slid into the carrier to bring the lips 17 into alignment with the openings 13 and also to bring the lips 18 into alignment with the openings 14. When such alignment is attained, the lips pass through the openings 13 and the lips 18 pass through the openings 14 and thereupon the holder or reinforcement R and, in this instance, the card 12 are secured in the carrier C.

Each of the lips 17 and 18 comprises portions which extend at right angles to each other whereby portions of these lips are spaced from, but extend parallel with, the main body of the reinforcement R. This spacing is such that when the lips 17 and 18 pass through the openings 13 and 14, in the manner above explained, the plate P may be slid under the lips 17 and 18 on the outer face of the carrier C and thereupon the portions of the card 12 and the carrier C disposed between the main body of the holder or reinforcement R and the plate P will be tightly embraced therebetween.

By reason of the fact that the lips 17 and 18 extend through the openings 15 and 16 and 13 and 14 in the manner hereinabove explained, the card 12 is held against longitudinal movement in the carrier C. It is essential, however, that the plate P be held against longitudinal movement of the face of the carrier, the lips 17 and 18 of course preventing transverse movement of the plate on the face of the carrier. Hence to prevent longitudinal movement of the plate P on the face of the carrier, a prong 19 is struck from the plate adjacent one end thereof and an opening 20 is formed in the face of the carrier in such position that when the plate P is in proper position in the lips 17 and 18, and on the face of the carrier, the prong 19 will pass through the opening 20. Openings 21 and 22 are respectively provided in the card 12 and in the reinforcement R to be aligned with the opening 20, and the prong 19 is of such extent that when it passes through the opening 20 it also passes through the openings 21 and 22. In this way the plate P is firmly held against longitudinal movement in the lips 17 and 18 and this arrangement also serves to insure retention of the card 12 in the carrier C.

The card as 12 is a fugitive part in that it will be replaced usually at predetermined times. On the other hand, the plate P may well be considered as a permanent part in that it will only be changed in extraordinary circumstances as where the person to whom the device of the present invention is issued moves from one address to the other, which will usually be far less frequent than the length of the periods for which the card 12 will be issued. Thus the company or the like which issues a device of the character to which this invention pertains will from time to time furnish the person to whom the device has been issued with a new card as 12 so as to thereby, for example, prolong the period for which credit is to be extended pursuant to the device. Furthermore, when the device is initially issued to a person by whom it is to be used, the carrier C, the card 12 and the plate P as well as the reinforcement R will usually be supplied separately for it is customary in devices of this character that provision is made for the person to whom the device is issued to sign the card 12 at a designated place for the purposes of identification.

However, once the card 12 has been signed and the device is ready to be assembled, the holder R will be mounted on what will be the back of the card 12 so that the lips 17 and 18 will respectively extend through the openings 15 and 16 in the card 12. Thereupon the card 12, with the holder or reinforcement R thereon, will be slid into the carrier or sleeve C until the lips 17 and 18 are respectively aligned with the openings 13 and 14. When the lips are aligned with these openings and have passed therethrough, the plate P will then be slid onto the face of the carrier C to be disposed beneath the lips 17 and 18 and as the plate P moves through the lips 17 and 18 the prong 19 will move into alignment with the opening 20. If an opening as 21 has previously been formed in the card 12, the prong 19 will then pass through this opening. However, it is not essential that an opening as 21 be previously formed in the card 12 for once the prong 19 has been passed through the opening 20, it may be passed through the card to the opening 22 in the reinforcement R. In any event after the prong 19 has passed through the card 12, it will enter the opening 22 in the holder or reinforcement. When this has been done, both the plate P and the card 12 will be firmly retained on the transparent carrier C.

When a new card 12 bearing, for example, a later expiration date is issued, the user of the device will remove the prong 19 from the openings 22, 21 and 20 and thereupon may slide the plate P from the lips 17 and 18. In order to facilitate insertion and removal of the card 12 from the carrier C notches as N may be formed in aligned portions of opposite faces thereof at one or both of the open ends thereof so as to facilitate gripping of the card 12. Then, once the plate P has been removed from the carrier C in the manner just explained, the face of the carrier C which appears in Fig. 1 may be sprung away from the lips 17 and 18 and thereupon the card 12 bearing the reinforcement R may be gripped at the portion exposed at the notches N and removed from the carrier C. The reinforcement R will then be removed from the old card 12 and placed on the new card which will then be inserted in the carrier C in the manner hereinabove described and the device will then be reassembled as explained above.

The form of my invention shown in Figs. 4, 5 and 6 is similar to that shown in Figs. 1, 2 and 3, and in Figs. 4, 5 and 6 those elements which correspond to elements disclosed in Figs. 1, 2 and 3 are indicated by the same reference character except that the suffix $a$ is added thereto.

Thus the device as illustrated in Figs. 4, 5 and 6 includes a transparent carrier $Ca$ made from material similar to that from which the carrier C is made, and the carrier $Ca$ is formed in a manner corresponding to the manner in which the carrier C is formed. Thus a series of openings $13a$ and another series of openings $14a$ are provided in what is to constitute the face of the carrier $Ca$, these openings $13a$ and $14a$ being located similarly to the openings 13 and 14.

Furthermore, a card $12a$ is provided which corresponds to the card 12 and this card $12a$ has two series of openings $15a$ and $16a$ therein which are adapted to be respectively aligned with the openings $13a$ and $14a$ in the manner hereinabove described in which the series of openings 15 and 16 respectively align with the openings 13 and 14.

A holder or reinforcement $Ra$ is provided for the plate $Pa$ but in this instance the holder or reinforcement R is in the form of a flat plate. Likewise, a printing plate $Pa$ is provided but in this instance the printing plate $Pa$ has a series of lips $17a$ and $18a$ along opposite edges thereof that are adapted to respectively pass through aligned openings $13a$ and $15a$ and $14a$ and $16a$, and the holder or reinforcement $Ra$ is adapted to be slid into these lips behind the card $12a$, as shown in Fig. 6. Type $Ta$ may be embossed on the plate $Pa$ in the manner explained hereinabove with reference to the type T on the plate P or in any other suitable manner, as will be explained.

In assembling the form of my invention shown in Figs. 4, 5 and 6, the plate $Pa$ is mounted on the face of the carrier $Ca$ and the lips $17a$ and $18a$ are respectively passed through openings $13a$ and $14a$. Then the card $12a$ is slid into the carrier $Ca$ until the openings $15a$ and $16a$ therein are respectively aligned with the lips $17a$ and $18a$ and thereupon these lips are caused to pass through these openings. The holder or reinforcement R is then slid into the carrier $Ca$ to pass beneath the portions of the lips $17a$ and $18a$ that extend parallel to the main extent of the plate $Pa$ and thereupon the portions of the face of the carrier $Ca$ and the card $12a$ between the plate $Pa$ and the reinforcement $Ra$ are tightly embraced between the plate and the reinforcement.

An opening $20a$ corresponding to the opening 20 is provided in the face of the carrier $Ca$ and at the time the plate $Pa$ is mounted on the face of the carrier $Ca$ the prong $19a$ on the plate $Pa$ at one end thereof is passed through the opening $20a$. Then when the card $12a$ is slid into the carrier $Ca$ and is in proper position therein, the prong $19a$ will pass through a previously formed opening $21a$ in the card or will be forced through the card to afford such an opening. In any event after the reinforcement $Ra$ is in proper position and when the prong $19a$ has passed through the openings $20a$ and $21a$, it will pass into an opening $22a$ in the reinforcement $Ra$ and thereupon both the plate $Pa$ and the holder or reinforcement are held against longitudinal movement in the carrier $Ca$.

It will be understood that while the prong 19 has been described as being provided on the plate P and the prong $19a$ has been described as being provided on the plate $Pa$, such a prong could well be provided on either the holder or reinforcement R or the holder or reinforcement $Ra$. In such an event an opening would be provided in either the plate P or the plate $Pa$ to receive the end of either the prong 19 or the prong $19a$ in the manner in which the free end of such a prong is received in the openings 22 or $22a$ in the holders or reinforcements R and $Ra$.

The form of my invention shown in Figs. 7, 8 and 9 also embodies a carrier there identified as $Cb$ but this form of the invention might also be viewed as being a laminated arrangement. Furthermore, while I have shown in Figs. 7, 8 and 9 an arrangement embodying two transparent walls having a card arranged intermediate thereof, it will be understood that in this laminated arrangement one of the transparent walls might be omitted, primarily because of the laminated construction, without departing from the purview of the invention.

However, the form of my invention as illustrated in Figs. 7, 8 and 9 includes a carrier $Cb$ embodying parallel walls or layers 25 and 26 of which at least the wall 25 is made of transparent material such as that of which the carriers C and $Ca$ are made. The wall 26 may, as stated, be omitted or, if desired, it might be made of a stiff reinforcing material and while it is desirable that this wall be made of transparent material, this is not essential although it will be obvious that if this wall is made of transparent material, then both faces of the card 12b that is interposed between the walls 25 and 26 will be visible. As shown, the walls 25 and 26 are complementary in outline with each other and with the card 12b that is mounted therebetween and preferably the marginal edges of the walls 25 and 26 and the card 12b are suitably joined together as by having an adhesive applied to adjacent faces near the margins thereof, resort also being had to some similar arrangement if only the wall 25 and the card 12b are employed.

While it is desirable that the wall 25, as explained above, be made of transparent material, this is not essential for if but two layers as the wall 25 and card 12b are employed, the data that would usually be visible through the transparent wall 25 might be provided on the face of the layer afforded by the card 12b opposite that disposed toward the wall 25. In any event, however, the wall 25 has a recess formed therein inwardly of the edges thereof and where the wall 25 is made of transparent material the data that are to appear on the card 12b are positioned on this card to be disposed about the recess 27 when the wall 25 and card 12b are joined. A printing plate Pb preferably consisting of a substantially rectangular sheet metal plate having type characters as Tb, corresponding to the type characters T and Ta, embossed thereon is mounted in the recess 27 to be retained therein so as to enable impressions to be made therefrom.

To prevent displacement of the plate Pb out of the recess 27 away from the face of the wall 25 of the carrier Cb appearing in Fig. 7, flanges 17b and 18b are formed along opposite edges of a reinforcement or holder Rb. As best shown in Figs. 7 and 8, the flanges 17b and 18b, which constitute a plate retaining means similar to the lips 17 and 18 and 17a and 18a, extend along the longer edges of the substantially rectangular holder or reinforcement Rb, which is preferably formed from sheet metal. The flanges 17b and 18b terminate in spaced relation with the shorter edges of the reinforcement Rb whereby marginal flanges 28 and 29 are provided along the shorter edges of the reinforcement Rb. The marginal flanges 28 and 29 are adapted to underlie the marginal portions of the wall 25 adjacent the shorter edges of the recess 27 and the flanges 28 and 29 are adhesively or otherwise suitably secured to such marginal portions of the wall 25 to thereby hold the reinforcement or holder Rb against displacement.

In the form of the invention shown in Figs. 7, 8 and 9 the printing plate Pb constitutes the permanent part. Hence, upon expiration of the period provided for by data appearing on the card 12b, a new carrier as Cb bearing a new card is sent to the customer to whom a device of the character shown in Fig. 7 has been furnished. The user then removes the plate Pb from the old device by inserting a suitable implement beneath the marginal portion along one of the shorter edges of the plate Pb so as to thereby clear the adjacent edge of the plate Pb from the adjacent shorter wall of the recess 27 and thereupon the plate Pb may be slid from the flanges 17b and 18b. The plate Pb will then be inserted into flanges corresponding to the flanges 17b and 18b on the new carrier as Cb and slid along through such flanges until the trailing edge of the plate passes beyond the adjacent of the shorter edges of the recess 27 whereupon the plate Pb is again retained in position on the carrier as Cb.

It will be understood that the essential elements of a device of the character to which this invention pertains are a transitory part as the card 12 and a permanent part as the plate P, and in some of the uses to which devices of this character may be put it will not be essential that protection for the card such as that afforded by the transparent carrier as C be provided. This may arise by reason of the fact that the device will not be carried on the person of the user but will rather be kept in a permanent place, and of course there will be other instances where mutilation of either a card or a plate may be readily prevented and of course the card may be made of a material which will effectively resist mutilation.

Therefore, resort may be had, in circumstances such as the immediately foregoing, to an arrangement such as that disclosed in Figs. 10, 11 and 12 and by referring thereto it will be seen that the device there illustrated comprises a card 12c much like the card 12, a printing plate Pc similar to the plate P and a holder or reinforcement Rc much like the holder or reinforcement R.

Thus, as shown in Figs. 10, 11 and 12, the card 12c has a series of openings 15c and another series of openings 16c positioned in the card in the manner hereinabove described with reference to the card 12 and the openings 15 and 16. Likewise, the holder or reinforcement Rc includes a series of lips 17c and 18c similar to the lips 17 and 18 and into which the printing plate Pc may be slid to thereby be retained against transverse movement on the face of the card 12c when the lips 17c and 18c are respectively passed through the openings 15c and 16c. Longitudinal movement of the plate Pc relative to the card 12c and the reinforcement or holder Rc is prevented by a prong 19c struck from the plate Pc and extended through an opening 21c in the card 12c into an opening 22c in the holder Rc much in the same manner as the prong 19 extends through openings in the card and holder. Furthermore, it will be understood that, as in the case of the prong 19 and the prong 19a, the prong 19c might be provided on the holder Rc in which event an opening for the reception of the same would be afforded in the plate Pc.

As in the case of the card 12, the card 12c will have identification data and the like thereon and inasmuch as it is a transitory part it may be replaced from time to time and when this is done, the plate Pc will be removed from the card and holder in the manner described hereinabove with reference to the plate P and the carrier C and parts thereof. As in the case of the plate P, the plate Pc has type characters Tc embossed thereon. As shown in Fig. 10 however, the type Tc are arranged for direct printing, which is to say, these type are so embossed in the plate Pc that they appear in reverse whereby ink is directly applied thereto when an impression is to be made therefrom, a common and suitable way for effecting this being to interpose an ink ribbon between the type Tc and the sheet or the like onto which an impression is to be made from the type.

It will be understood that the type T on the plate P or the type Ta on the plate Pa or the type Tb on the plate Pb might be embossed on these plates in the same manner as that in which the type Tc are embossed on the plate Pc, which is to say, in such a way as to effect direct printing therefrom. Moreover, if desired, the type Tc might be embossed on the plate Pc so as to afford direct reading thereof as is afforded by the type T embossed on the plate P, in which event impressions will be made from the type Tc in the manner hereinabove described with reference to the type T.

It will also be understood that there may be instances where it will be desirable that a card as 12c including a printing plate as Pc and a reinforcement as Rc be protected against mutilation and that this may be conveniently done by providing an envelope into which this assembly may be slid. If resort is had to such an arrangement, there will be instances where such an envelope might advantageously be made of transparent material, such as that of which the carrier C is made, and if such an envelope is provided, it will be desirable that the end thereof, opposite that at which notches as N would be provided, be closed. It will also be understood that an envelope suitable for the purpose of protecting a card as 12c against mutilation might be made of non-transparent material without departing from the purview of my invention.

It will be manifest from the foregoing description that I have provided a device suitable for use in those instances where credit is to be extended or other business transactions are to be carried out under such terms and conditions that the transactions will only be valid if conducted within a predetermined period. In order to enable this to be accomplished the device of my invention includes a card which may be replaced from time to time and which when so replaced will extend the period for which transactions conducted pursuant to the device are to be valid. Thus the card constitutes a transitory member.

The device also embodies a permanent member in the form of a printing plate which, in the illustrated embodiments of the invention, is a substantially rectangular sheet metal plate having type characters embossed thereon. Each of the embodiments of my invention herein described enables this permanent part, a printing plate as P, to be readily associated with the transitory part as the card 12. Furthermore, where a transparent carrier as C is provided, data appearing on the card as 12 may be readily ascertained but at the same time such card is protected against mutilation by reason of careless or frequent handling or the like by the carrier as C.

As explained hereinabove, my invention is useful in those instances where credit is extended to customers of a business institution having a plurality of places of business and of which the retailers of gasoline, oil and the like to the motoring public are examples, but it will be understood that my invention is not limited to such usage for it could also be used in connection with transactions involving the purchase of air line tickets and the like. Furthermore, while the invention is primarily intended for use by those business institutions having a plurality of places of business, the invention is also capable of use by businesses or the like having but one or a few places of business as, for example, retail stores and the like. Moreover, this invention may be advantageously used as employee identification by factories and the like where it is often desirable to frequently renew identification data but where it is desirable that permanent data such as the name and address of an employee and the like be available in permanent form and in such form that impressions may be made therefrom.

Thus while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A device of the character described comprising a transitory part affording identification means, a permanent part affording printing means, a holder plate, said permanent part and said holder plate being arranged on opposite faces of said transitory part and said transitory part having openings therein, and means passed through said openings and interconnecting said permanent part and said holder plate and operative to prevent displacement thereof from said transitory part.

2. A device of the character described comprising a carrier, a printing plate on one face of said carrier, a holder plate for said printing plate on the other face of said carrier, and means passed through said carrier and interconnecting said plates and operative to prevent undesired displacement thereof from said carrier.

3. A printing device comprising a transparent carrier, a printing plate mounted on one face of said carrier inwardly of the edges thereof, a card in said carrier and bearing data in position to be displayed through said transparent carrier and about said plate, and means for retaining said plate against undesired displacement from said carrier.

4. A printing device comprising a transparent carrier, a printing plate mounted on one face of said carrier inwardly of the edges thereof, a card mounted in said carrier and bearing data in position to be displayed through said transparent carrier and about said plate, and releasable means for retaining said plate and card against undesired displacement from said carrier.

5. A printing device comprising a transparent carrier, a printing plate mounted on one face of said carrier inwardly of the edges thereof, a card in said carrier and bearing data in position to be displayed through said transparent carrier and about said plate, a reinforcement plate for said printing plate, and means interconnecting said plates and operative to prevent displacement of the plates from said carrier.

6. A printing device comprising a transparent carrier, a printing plate mounted on one face of said carrier inwardly of the edges thereof, a card mounted in said carrier and bearing data in position to be displayed through said transparent carrier and about said plate, a reinforcement plate for said printing plate, and means extended through a portion of said carrier and interconnecting said plates and operative to prevent displacement of the plates from said carrier.

7. A printing device comprising a transparent carrier, a printing plate mounted on one face of said carrier inwardly of the edges thereof, a card mounted in said carrier and bearing data in position to be displayed through said transparent carrier and about said plate, a reinforcement plate for said printing plate, and means extended through a portion of said carrier and through said card and operative to prevent displacement of said printing plate, card and reinforcement plate from said carrier.

8. A printing device comprising a transparent carrier, a printing plate mounted on one face of said carrier inwardly of the edges thereof, a card mounted in said carrier and bearing data in position to be displayed through said transparent carrier and about said plate, and means extended through a portion of said carrier and said card and operative to prevent displacement of said plate and card from said carrier.

9. A printing device comprising a transparent carrier, a printing plate mounted on one face of said carrier inwardly of the edges thereof, a card mounted in said carrier and bearing data in position to be displayed through said transparent carrier and about said plate, said carrier having spaced openings therein, and means extended through said openings and operative to prevent displacement of said plate and card from said carrier.

10. A printing device comprising a transparent carrier, a printing plate mounted on one face of said carrier inwardly of the edges thereof, a card mounted in said carrier and having openings therein and bearing data in position to be displayed through said transparent carrier and about said plate, and means on said plate extended through said openings and operative to prevent displacement of said plate and card from said carrier.

11. A printing device comprising a transparent carrier, a printing plate mounted on one face of said carrier inwardly of the edges thereof, a card mounted in said carrier and bearing data in position to be displayed through said transparent carrier and about said plate, a reinforcement plate for said printing plate, said carrier having spaced openings therein, and means extended through said openings and operative to prevent displacement of said card, reinforcement plate and said printing plate from said carrier.

12. A printing device comprising a carrier including parallel walls of which at least one has a recess therein, a printing plate in said recess, a holder mounted on one of said walls in alignment with said recess and having retaining means for maintaining the holder in alignment with the recess, and means interconnecting said plate and holder and operative to retain said plate in said recess.

13. A printing device comprising a carrier including parallel walls of which at least one is transparent and having a recess in a transparent wall thereof, a card retained between said walls, a printing plate mounted in said recess, and means for preventing displacement of said plate from said recess.

14. A printing device comprising a carrier including parallel walls of which at least one is transparent and having a recess in a transparent wall thereof, a printing plate mounted in the recess, a card retained between said walls and bearing data in position to be displayed through the transparent wall having the recess therein and about said recess, a printing plate in said recess, and means for preventing displacement of said plate from said recess.

15. A printing device comprising a carrier including parallel walls of which at least one is transparent and having a recess in a transparent wall thereof, a holder retained between said walls and having retaining means thereon disposed along opposite edges of said recess, a printing plate mounted in said retaining means and between the edges of said recess that extend in angular relation with the aforesaid opposite edges thereof, and a card retained between said walls and bearing data in position to be displayed through the transparent wall having the recess therein and about said recess.

16. A printing device comprising a transparent carrier, a printing plate mounted on one face of said carrier inwardly of the edges thereof, a card mounted in said carrier and having openings therein and bearing data in position to be displayed through said transparent carrier and about said plate, said printing plate being disposed on one face of said card, a holder plate on the opposite face of said card, and means on said holder plate extended through said openings and operative to prevent displacement of said plate and card from said carrier.

17. A device of the character described comprising a carrier, a printing plate on one face of said carrier, a holder plate for said printing plate on the other face of said carrier, and means on said holder plate passed through said carrier and interconnecting said plates and operative to prevent undesired displacement thereof from said carrier.

18. A device of the character described comprising a carrier, a printing plate on one face of said carrier, a holder plate for said printing plate on the other face of said carrier, and means on said printing plate passed through said carrier and interconnecting said plates and operative to prevent undesired displacement thereof from said carrier.

ELMER F. RICHTER.